United States Patent
Zelander

(10) Patent No.: US 6,658,992 B2
(45) Date of Patent: Dec. 9, 2003

(54) DEVICE FOR REMOVING BAKED PRODUCTS

(75) Inventor: Björn Zelander, Mölndal (SE)

(73) Assignee: Santa Maria AB, Mölndal (SE)

( * ) Notice: Subject to any disclaimer, the term of this patent is extended or adjusted under 35 U.S.C. 154(b) by 0 days.

(21) Appl. No.: 10/181,895

(22) PCT Filed: Feb. 28, 2001

(86) PCT No.: PCT/SE01/00425
§ 371 (c)(1),
(2), (4) Date: Sep. 26, 2002

(87) PCT Pub. No.: WO01/64038
PCT Pub. Date: Sep. 7, 2001

(65) Prior Publication Data
US 2003/0056659 A1 Mar. 27, 2003

(30) Foreign Application Priority Data
Feb. 28, 2000 (SE) ............................................. 0000639

(51) Int. Cl.[7] ........................... A23L 1/00; A21C 15/00; A47J 37/12
(52) U.S. Cl. .............................. 99/404; 99/353; 99/427; 99/443 C
(58) Field of Search ........................... 99/352–355, 427, 99/431, 403–410, 443 R, 443 C, 477–479; 198/836.1, 803.9, 406; 425/412, 452, 394; 426/523, 438

(56) References Cited

U.S. PATENT DOCUMENTS

| | | | | |
|---|---|---|---|---|
| 3,667,372 A | | 6/1972 | Hilvitz et al. | |
| 3,946,655 A | * | 3/1976 | Schy ............................ | 99/404 |
| 3,948,160 A | * | 4/1976 | Stickle ......................... | 99/404 |
| 4,184,418 A | * | 1/1980 | Jimenez ....................... | 99/353 |
| 4,530,275 A | | 7/1985 | Stickle et al. | |
| 4,754,699 A | * | 7/1988 | Cope et al. .................... | 99/404 |
| 4,760,775 A | * | 8/1988 | Hoskins ....................... | 99/353 |
| 5,020,426 A | * | 6/1991 | Cope et al. .................... | 99/353 |
| 5,743,174 A | | 4/1998 | Stickle | |
| 6,073,544 A | * | 6/2000 | Stickle ........................ | 99/404 |

* cited by examiner

Primary Examiner—Timothy F. Simone
(74) Attorney, Agent, or Firm—Burns, Doane, Swecker & Mathis, L.L.P.

(57) ABSTRACT

The invention relates to a device for removing baked products (2) from a conveyor (1), for example so-called tubs, which bear against a mold part (13) which is preferably adapted to the shape of the baked products. The device is characterized in that at least one ejector (20) is ejectable from the mould contour of the mold part (13) in order to release the baked products from the respective molds.

12 Claims, 3 Drawing Sheets

DEVICE FOR REMOVING BAKED PRODUCTS

TECHNICAL FIELD

The present invention relates to a device for removing baked products from a conveyor, for example so-called tubs, which bear against a mould part which is preferably adapted to the shape of the baked products.

TECHNICAL BACKGROUND

A conveyor device of the type mentioned above is already known from U.S. Pat. No. 4,530,275. That document describes a deep-frying device through which so-called tubs are transported. The word tubs is used as a name for cup-shaped or boat-like baked product shells which are intended to receive food products. Moulds included in the above device are provided in a first step with baking dough and are then pressed together and, with the dough clamped between the mold parts, are transported forwards and down into a deep-fryer. The moulds are then opened one after another as they are brought up out of the deep-fryer, and finally the baked product shells are emptied out of them. The moulds in the above document consist of perforated male and female parts which, when pressed together, give the baked product its shape. On account of the large amount of fat present at the deep-frying step, the baked product shells easily stick in the molds, because the baking dough is partially pressed into the mould perforations when the molds are closed. In addition, the baked products quickly harden after leaving the deep-fryer, and this also contributes to the shells being difficult to remove. A further disadvantage of the above invention is that the baked product shells easily fall apart when they are removed from the moulds because they are brittle.

SUMMARY OF THE INVENTION

It is an object of the present invention to eliminate the above problems and to ensure that said baked products can be easily and efficiently released from their molds, i.e. that the baked products are removed and delivered from the conveyor without falling apart.

According to the invention, this object is achieved by the device of the type mentioned in the introduction. Preferred embodiments of the device will be evident from the sub-claims.

The fact that the ejector according to one embodiment of the invention extends along the inner contour of the mould part affords the advantage that the ejector does not leave any obvious impressions on the baked product shell.

DESCRIPTION OF THE DRAWINGS

The invention will be described below in greater detail by way of example and with reference to the accompanying drawings, in which.

DESCRIPTION OF PREFERRED EMBODIMENTS

Figure 1:
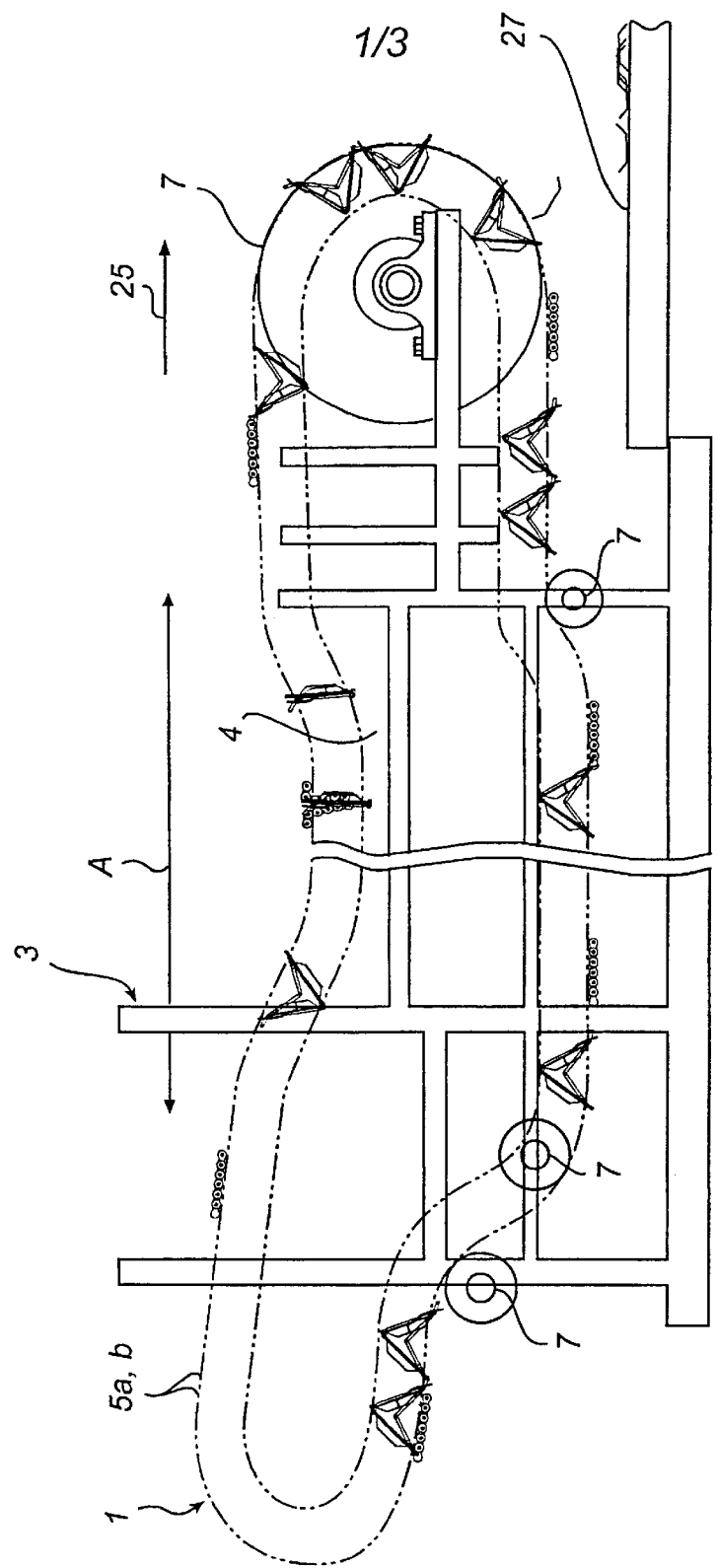
FIG. 1 shows a schematic side view of a conveyor device according to the invention.
Figure 2:
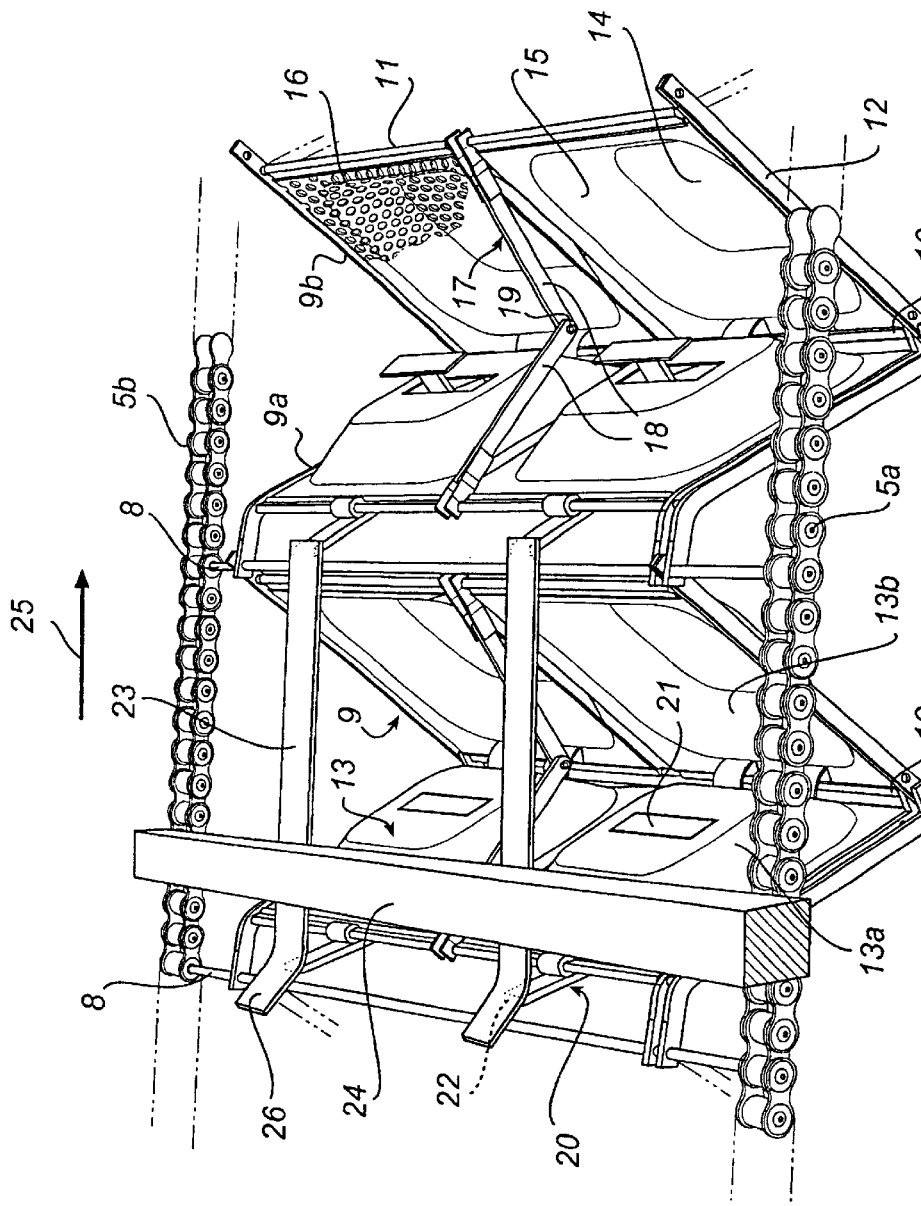
FIG. 2 is a perspective view of a portion of the device according to FIG. 1, and FIGS. 3 and 4 are sectional views of details from FIG. 2 intended to more clearly illustrate their function.
Figure 3:
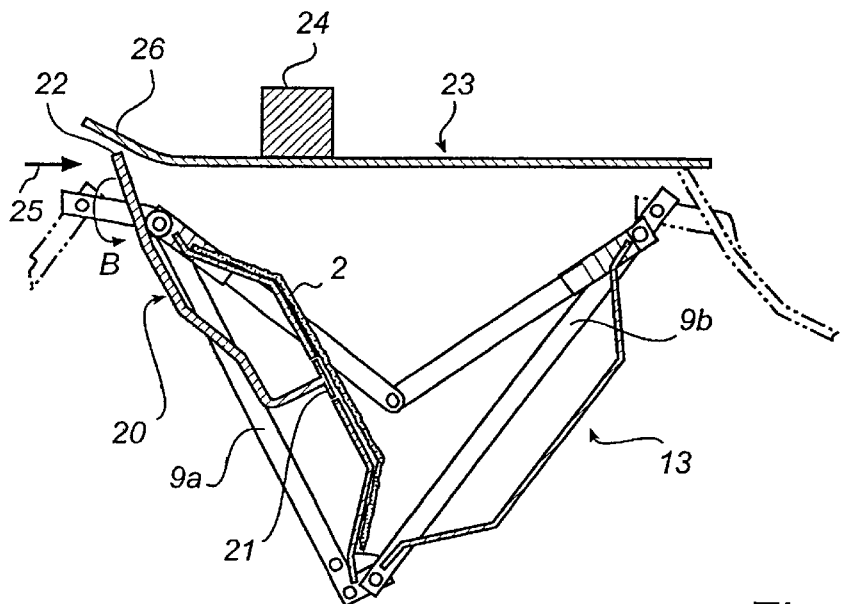

FIG. 1 shows the whole of a conveyor device which in terms of its main features can be constructed in a similar way to the conveyor which is described in U.S. Pat. No. 4,530,275. In the example shown, so-called tubs' are being transported through a deep-frying unit. Since a deep-frying unit and conveyor of this kind already belong to the prior art, they are not described in full here. Reference number 1 designates a conveyor track for conveying baked product shells 2. The conveyor track 1 is supported by a main frame 3. A portion of the conveyor track extends through a bath 4 of boiling oil for deep-frying baked product shells, preferably so-called tubs or taco shells. The conveyor track 1 consists of a first conveyor 5a and a second conveyor 5b in the form of two parallel chains running in synchrony. The conveyor track 1 above is preferably divided into two parts. In part A the chains slacken when the moulds are pressed together, and at least after part A the chains are in the stretched state. Control devices for this chain regulation are not shown, since this can preferably be done using already known technology. The chains 5a and 5b run over a number of deflection wheels 7, some of which are expediently driven by a motor (not shown). At a number of points along the conveyor device there are also guide rails which are used to prevent the chains from hanging down when the moulds are open and are advanced by the drive device (not shown). Between the two conveyor chains there are a number of carrier axles 8 arranged at a fixed distance from each other. The carrier axles 8 support frames 9 which can be folded together. The area between two carrier axles is shown in FIGS. 2 and 3 and consists in more detail of a first frame part 9a and a second frame part 9b which are connected to each other in an articulated manner via an axle 10 which extends parallel to the carrier axle. Each frame part 9a and 9b is made up of side and edge pieces 11 and 12 respectively which together support a mould part 13. Each mould part 13 has a specific mould contour and, in the embodiment shown, consists of two female mould parts 13a or two male mould parts 13b arranged alongside each other, the male and female parts fitting into each other. Each mould part 13 has a base which merges into wall sections 15. Most or preferably all of the mould part 13 is perforated to make deep-frying easier. The perforations mean that deep-frying oil can easily penetrate into the baked product shell 2, and the quality of the final product is thus improved. A cutter 17 is also arranged between the frame parts 9a and 9b. The cutter 17 consists of two branches 18 which are connected to each other via a toggle joint 19 and are connected pivotably to the side pieces 11 of the respective frame part. The cutter is used to remove excess baking dough and to separate the baked product shells from each other, which takes place when the frame structure is closed.

Reference number 20 designates an ejector which, in the embodiment shown, has a portion extending along the inner contour of the mould part, preferably in the form of a plate 21. The plate 21 of the ejector is supported by a lever system 22 with two lever arms, the first arm having a stop portion 22a and the second lever arm 22b supporting the plate 21 which is intended to act against the baked product shell 2. The ejector 20 according to the invention is connected in an articulated manner to the mold part 13a which in turn is supported by the frame part 9a.

Figure 4:
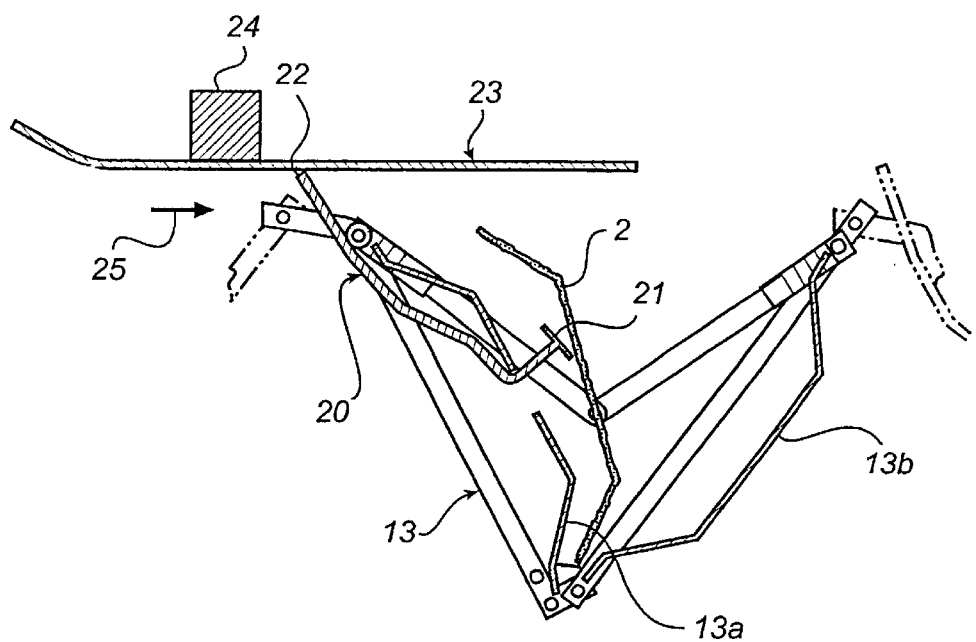

When the conveyor chains 5a and 5b are in the fully stretched state, i.e. when the carrier axles 8 are completely separated from each other, the frames are opened and the two frame parts 9a and 9b together form an open V-shape. After the area A, i.e. after the frames 9 have left the fryer 4 and have opened, two control stops 23, which are arranged at a suitable distance from each other, reach a position, in relation to the stop portion 22a of the ejectors, in which the ejectors 20 are activated. The control stops 23 are expediently fixed in a stationary position, preferably in the stand 3 via a stand part 24, see FIG. 2. FIGS. 3 and 4 illustrate how the ejector 20 interacts with the control stop 23. To ensure that the baked product shells 2 are removed in a gentle movement, the first end of the control stop, seen in the direction of transport 25 of the conveyor, is provided with a portion 26 which is curved upwards counter to the feed direction followed by a portion which is oriented along the plane of movement of the conveyor.

The function of the device shown will now be described in more detail:

Incoming baked products 2, for example so-called tubs, arrive on the conveyor 1, after the deep-fryer 4, resting against the mold parts, which are supported by the V-shaped frame system. Upon movement of the frames in the direction of the arrow 25, the lever portion 22 of the ejector comes into contact against the control stop 23. FIGS. 3 and 4 illustrate when the frame system passes the control stop 23. When an open frame 9 passes the control stop 23, the stop portion 22a of the ejector is placed against the control stop portion 26 which is curved upwards counter to the feed direction. The stop portion 22a of the ejector extends vertically above the straight portion of the control stop. When the conveyor 1 moves in the direction 25, the ejector 20 is forced to yield to the control stop 23, i.e. a lever effect is initiated. This gives a counter-clockwise pivoting movement B of the lever arm, the base plate 21 being pressed against the baked product shell 2. The force from the plate is distributed along a surface of the baked product shell 2 which thus comes loose from its mold part. As long as the stop portion 22a of the ejector bears against the straight portion of the control stop, as is illustrated in FIG. 4, the base plate 21 of the ejector is kept pivoted out from the base portion of the mold part. When the stop portion 22a of the ejector passes the end edge of the control stop, the ejector 20 returns to its original position, in which the base plate 21 of the ejector coincides with the inner surface of the base of the mold part. The baked product shell 2 now rests loosely against the mold part 13, preferably the female mold part. The baked product shells 2 are delivered to a delivery station 27, as is illustrated on the right in FIG. 1. As the conveyors are forced round a deflection wheel 7 (again the one on the right in FIG. 1), the baked product shells preferably fall over to the male mold part 9b, if they are not already located there, and they are finally removed from their respective mold parts 13 by means of their own weight. The conveyor is driven onwards in the transport direction without a load.

ALTERNATIVE EMBODIMENTS

Although the baked product shells 2 shown have essentially a boat or basket shape, the ejector 20 according to the invention can also be used to remove baked products with different shapes. These baked products can, for example, be slightly curved, cup-shaped or basket-like with six edges or eight edges. The mold parts are again preferably adapted to the shape of the baked products. In the embodiment shown, the baked products 2 are advanced in two rows, but single rows or several rows are also conceivable. Likewise, a frame part does not need to consist of only two mold parts 13. Using more or fewer mold parts than two per frame part is of course also within the scope of the invention. The ejector 20 does not necessarily have to function as a two-armed lever 22. It can, for example, be in the form of a projecting pin, or the mold contour of the actual mold part can also be flexible, for example against a spring action.

The previously described control stop 23 can for example be arranged across the whole conveyor, preferably in one piece, like a cover part which extends across the conveyor in such a way that it cooperates with stop portions 22a arranged alongside each other. There does not therefore have to be one control stop per mold part. It is also possible for the frame to constitute the mold. The track 23 of the control stop can also be inclined relative to the direction of movement 25 of the conveyor 1. The inclination and/or position of the control stop can preferably be adjusted. It is also conceivable to arrange several control stop devices 23 in succession in order to ensure that all the baked product shells 2 come loose from their respective mold parts 13. The shape of the control stop surface 23 can also vary according to the requirements regarding the position of the active part 21 of the ejector 20 in relation to the mould part in question.

It will be appreciated that many modifications of the above-described embodiment of the invention are possible within the scope of the invention, as set out in the attached claims.

What is claimed is:

1. A device for removing baked products (2) from a conveyor (1), for example so-called tubs, which bear against a mold part (13) which is preferably adapted to the shape of the baked products, wherein at least one ejector (20) extends along the contour of the mold part (13) and is ejectable from the mold contour of the mould part (13) in order to release the baked products from the respective moulds, characterised in that the ejector (20) is supported by a lever system (22) and that said ejector (20) is connected in an articulated manner to the mold part (13) in question, preferably via a frame system (9) which supports said mold part and which in turn is connected to the conveyor (5) and is thus entrained with the latter's movement, and that the device has at least one control stop (23) which is intended to interact with the ejector (20) in the path of movement of the conveyor (5).

2. A device according to claim 1, wherein the ejector (20) is designed in the form of a tow-armed lever (22), one arm of which has a stop portion (22a) for interaction with said control stop (23), and of which the second lever arm (22b) is intended to act with pressure force against the baked product shell (2), which means that the contact of the baked product shell (2) with the other portions of the mold part ceases.

3. A device according to claim 1, wherein the control stop (23) is intended to temporarily interact with the stop portion (22a) of the ejector.

4. A device according to claim 1, wherein the ejector extends in the form of a plate (21).

5. A device according to claim 4, wherein the plate (21) is perforated.

6. A device according to claim 2, wherein the control stop (23) is intended to temporarily interact with the stop portion (22a) of the ejector.

7. A device according to claim 2, wherein the ejector extends in the form of a plate (21).

8. A device according to claim 3, wherein the ejector extends in the form of a plate (21).

9. A device according to claim 6, wherein the ejector extends in the form of a plate (21).

10. A device according to claim 7, wherein the plate (21) is perforated.

11. A device according to claim 8, wherein the plate (21) is perforated.

12. A device according to claim 9, wherein the plate (21) is perforated.

* * * * *